US008756497B2

(12) United States Patent  
Le Chevalier et al.

(10) Patent No.: US 8,756,497 B2  
(45) Date of Patent: Jun. 17, 2014

(54) NAVIGATING AN ELECTRONIC DOCUMENT BY VISUAL OBJECT ELEMENTS

(75) Inventors: Vincent Le Chevalier, San Jose, CA (US); Charles F. Geiger, San Jose, CA (US)

(73) Assignee: Chegg, Inc., Santa Clara, CA (US)

( * ) Notice: Subject to any disclaimer, the term of this patent is extended or adjusted under 35 U.S.C. 154(b) by 0 days.

(21) Appl. No.: 13/305,484

(22) Filed: Nov. 28, 2011

(65) Prior Publication Data

US 2013/0139053 A1 May 30, 2013

(51) Int. Cl.
*G06F 17/00* (2006.01)

(52) U.S. Cl.
USPC .................. 715/255; 715/776; 382/176

(58) Field of Classification Search
None
See application file for complete search history.

(56) References Cited

U.S. PATENT DOCUMENTS

| 2009/0125544 | A1* | 5/2009 | Brindley | 707/102 |
| 2011/0229035 | A1* | 9/2011 | Sohma et al. | 382/176 |
| 2011/0252315 | A1* | 10/2011 | Misawa et al. | 715/256 |

* cited by examiner

*Primary Examiner* — Stephen Hong  
*Assistant Examiner* — Asher Kells  
(74) *Attorney, Agent, or Firm* — Fenwick & West LLP (57) ABSTRACT

An education digital reading platform provides a visualization interface displaying visual object elements of a document to a user. A visual object element may include images, videos, charts, tables, etc. The visual objects may be identified in a document by extracting metadata associated with the document. Additionally, the ideas or concepts represented by the visual object elements may be identified by analyzing the document, and content related to the ideas or concepts may be identified and associated with the visual object elements. The related content may include user generated content or content stored in one or more databases. The related content is provided to a user in the visualization interface wherein the user may access the related content. The interface allows a user to navigate a document by moving from one visual object element to another.

22 Claims, 9 Drawing Sheets

NAVIGATING AN ELECTRONIC DOCUMENT BY VISUAL OBJECT ELEMENTS

CROSS REFERENCE TO RELATED APPLICATIONS

This application is related to Provisional Application No. 61/741,771, filed Oct. 4, 2011, which is incorporated by reference in its entirety.

BACKGROUND

1. Field of the Invention

This invention relates to a publishing platform for aggregating, managing, and delivering electronic content to connected consumer electronic devices.

2. Description of the Related Art

The education publishing industry faces a number of significant challenges to effectively delivering media and services through an on-line delivery network. These challenges center around four discrete phases:
1. Ingestion: A lack of digital textbook standardization, a plethora of incompatible formats, and a lack of integration and interoperability between publishers makes it difficult to ingest and aggregate a large volume of educational content efficiently and reliably.
2. Publishing: Significant transformation of education content needs to be undertaken to ensure that the content is suited to publish across a variety of client devices that users may use to access the content.
3. Distribution: In an electronic distribution environment, particular attention needs to be given to issues of content protection and rights management, as well as service policies and quality of service, so that content providers are fairly compensated and users of the content perceive the value and reliability of the service.
4. Connected Services: In an educational platform, there exists the potential to deliver a rich user experience that extends beyond electronic access to textbooks. To implement such connected services would require complex business rules and content models that are unavailable in existing education digital publishing services.

Effectively enabling and managing each of the above four phases has not yet been accomplished by the education publishing industry. Accordingly, this has inhibited the growth of delivering media and services through an on-line delivery network.

SUMMARY

Embodiments of the invention provide an education digital reading platform that provides aggregation, management, and distribution of digital education content and services. An education digital publishing platform ingests content from a variety of content sources, transforms the content for web-based publication, and distributes the content to connected end-user devices. In addition, the education digital publishing platform provides visualization services that provide alternative organizational frameworks for document data, such as organizing document data around visual object elements of the documents. By offering an alternative view of the content, these visualizations services may enhance a user's engagement with and understanding of the content.

In one embodiment, the education digital reading platform includes an ingestion system. The ingestion system checks content files from a variety of content sources for conformity to one of a variety of content format standards, assigns a unique identifier to each content file, and stores the content files for access by other systems of the education digital reading platform.

In one embodiment, the education digital reading platform includes a publishing system. The publishing system transforms content, for example from PDF or ePUB format, into a markup language such as HTML5 web format for distribution across a variety of consumer electronic devices connected to the platform via a network. The transformed content preserves the original page structure of the content document regardless of the original format of the content file. In one implementation, a correlation sub-system compares the rendered HTML5 pages to the original source pages, and establishes a correlation factor between the files that is indicative of the page fidelity quality. In one implementation, the publishing system also associates, creates, or extracts metadata for every content file added to the platform. For example, an enhanced metadata process creates an additional layer of metadata based on a combination of semantic analysis and business intelligence. The enhanced metadata can be used to support the delivery of services related to the education digital reading platform.

In one embodiment, the education digital reading platform includes a distribution system. The distribution system packages the content for delivery, uploads the content to content distribution networks, and makes the content available to end-users based on the digital rights management policies that govern access to that content. The users access the content and related services from client devices connected via a network. For example, client software within a HTML5 compatible browser on the user's client device receives HTML5 formatted content along with a host of document specific metadata that enhance the user's reading experience with the document.

In one embodiment, the education digital reading platform organizes document data based on visual object elements therein. For example, the education digital reading platform identifies visual object elements such as images, graphs, tables, formulas, special characters, etc., within a document and displays a visual object element to the user. The visual object element may include a reference number and a caption that describes the visual object element. Additionally, the education digital reading platform identifies text that explains or provides additional information about the visual object element; such text may be displayed to the user upon a user request. In one embodiment, the education digital reading platform also provides a user interface wherein a user may navigate through a digital document by jumping from one visual object element to the next. As such, a user is provided with an interface allowing a user to absorb a large amount of data quickly and reliably.

The features and advantages described in this summary and the following detailed description are not all-inclusive. Many additional features and advantages will be apparent to one of ordinary skill in the art in view of the drawings, specification, and claims hereof.

One skilled in the art will readily recognize from the following discussion that alternative embodiments of the structures and methods illustrated herein may be employed without departing from the principles of the invention described herein.

DETAILED DESCRIPTION OF THE EMBODIMENTS

System Overview

Figure 1:
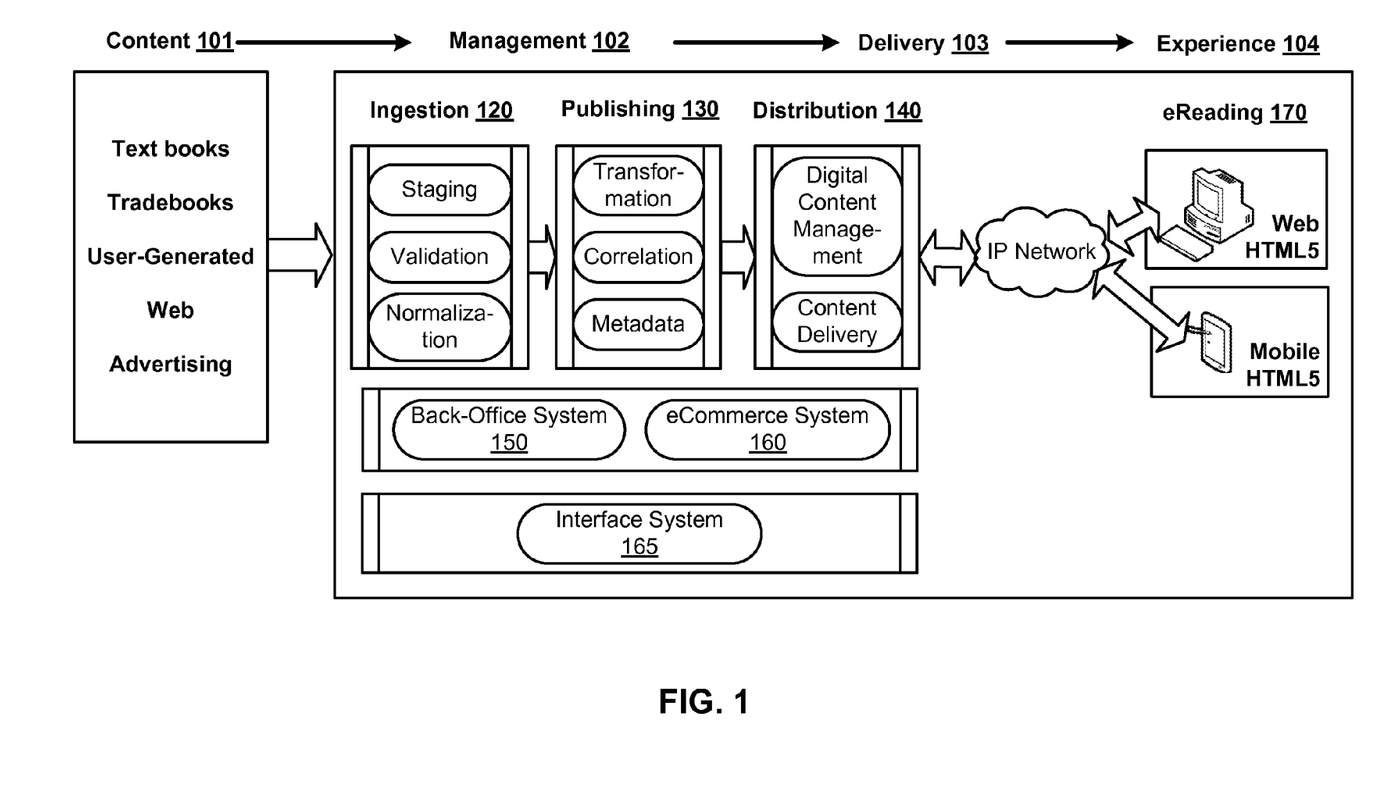
FIG. 1 is a high-level block diagram of a platform environment in accordance with an embodiment of the invention.

Embodiments of the invention provide an education digital reading platform that provides aggregation, management, and distribution of digital education content and services. The platform is an integrated solution for delivering content and education services through an on-line delivery network to connected client devices. FIG. 1 is a high-level block diagram of the platform environment in accordance with an embodiment of the invention. As illustrated in FIG. 1, the platform is organized around four main function blocks: content 101, management 102, delivery 103, and experience 104.

Content 101:

The platform is configured to automatically gather and aggregate content from a large number of sources, categories, and partners. Examples of content include textbooks, tradebooks, user-generated content, web content, and advertising content. The content function block 101 of the platform collects the content into a formalized staging environment for further processing by the platform.

Management 102:

The management function block 102 represents the core of the platform. The management function block 102 is based on six sub-systems and related processes, including ingestion 120, publishing 130, distribution 140, back-office 150, eCommerce 160, and interface 165. The management function block 102 aggregates, validates, transforms, packages, and monetizes the content collected by the content function block 101 into a number of business services, prior to distribution by the platform. The ingestion sub-system 120 will be described in detail with reference to FIG. 2, the publishing sub-system 130 with reference to FIG. 3, the distribution sub-system 140 with reference to FIG. 4, the back-office sub-system 150 with reference to FIG. 5, the eCommerce sub-system 160 with reference to FIG. 6, the interface sub-system 165 with reference to FIGS. 7-98.

Delivery 103:

In the delivery function block 103, wired and wireless delivery networks are used to distribute content and services seamlessly across a wide variety of connected consumer devices. The delivery function block 103 packages the content for end-user consumption by distributing it across a hybrid network of traditional Content Delivery Networks (CDN) and other infrastructure. Content is then authorized for on-line delivery based on end-user rights management, content policies and user profiles. The delivery function block 103 also monitors and reports overall quality of service, and network and distribution specific activities, in some embodiments.

Experience 104:

In the experience function block 104, users access the content from web browsers on consumer devices connected to a network, such as a personal computer (such as a desktop, laptop, or tablet computer), a personal digital assistant, a mobile or smart phone, or a television "set-top box" using a client web application. As a result of transforming education content and serving it through this platform, users enjoy high-quality and consistent education reading experiences and connected services. As the user experiences the content, the user's web browser regularly communicates with the platform for updating reading content and connected services. This client-server communication system is used to aggregate and upload various end-user data to report the user's reading activities to the platform as well as checking the type and quality of the network to which the user's device is connected.

In one implementation, contrary to other existing digital publishing services such as Amazon Kindle, the user is not required to download a specific reading application from the publisher on to an end-user device in order to access the content. There is no stand-alone application needed to access the education content and services. Rather, client software within a HTML5 compatible browser on the user's computer receives structureless HTML5 page elements to construct pages of a document, along with a host of document specific metadata that enhance the user's reading experience with the document, such as, for example, thumbnail navigation and an interactive table of contents. The client software integrates a number of the user's reading activities, such as, for example, creating highlights, taking notes, and accessing a dictionary. Annotation services enable a reader to create highlights, drawings, notes, comments, and other personalized data that is overlaid within the original content. This type of user-generated content is stored and archived into the on-line end user account so that it can be synchronized across all registered devices for given end-user. Thus, the user's user-generated content can be accessed from any of the user's registered devices. Moreover, the platform enables the user-generated content and other user activities to be optionally shared among friends, classmates, campus, or other groups, as part of an education social platform.

Ingestion System

Figure 2:
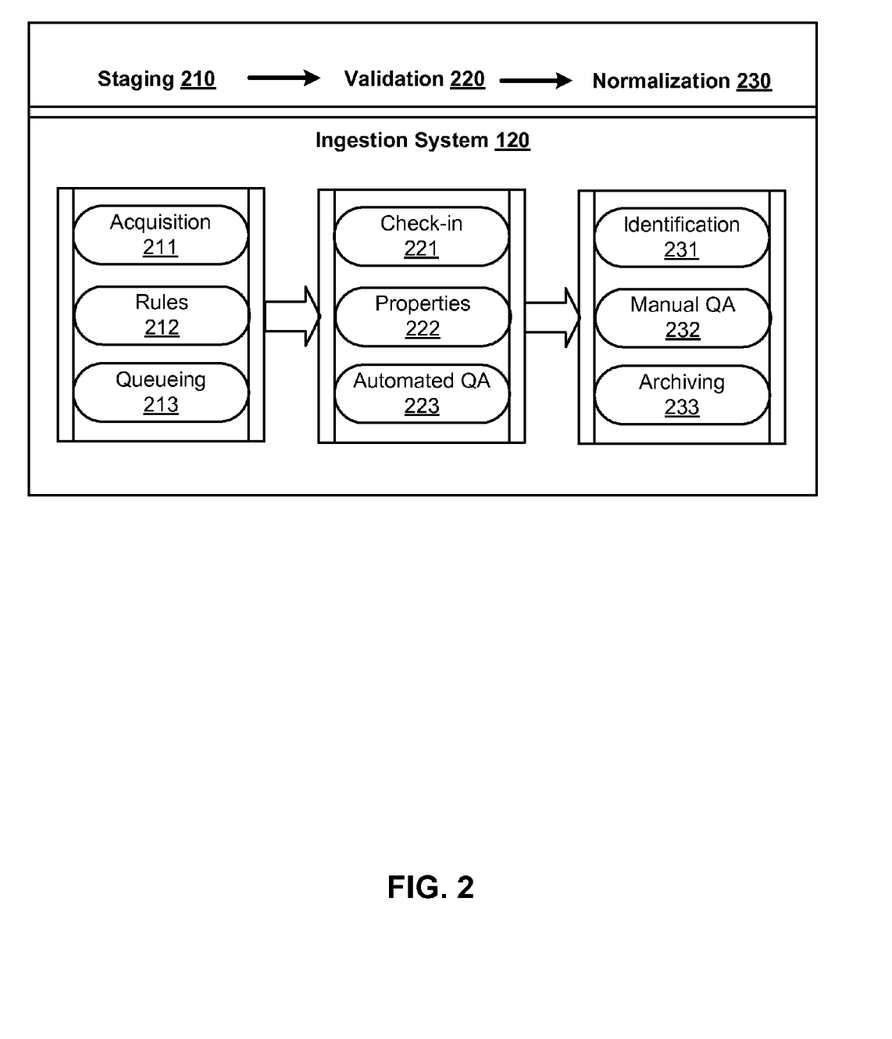
FIG. 2 illustrates a block diagram of an ingestion system, in accordance with an embodiment of the invention.

FIG. 2 illustrates a block diagram of an ingestion system 120, in accordance with an embodiment of the invention. The ingestion system 120 is a sub-system of the management function block 102 of the platform illustrated in FIG. 1. The ingestion system 120 includes three primary sub-systems: staging 210, validation 220, and normalization 230.

Staging 210:

The content staging sub-system 210 of the ingestion system 120 includes three processes: acquisition 211, rules creation 221, and queueing 213. The acquisition process 211 includes mapping the source and characteristics of all the content to be ingested. Example characteristics include type of content (such as user-generated content), file formats (such as PDF/A, ePub, etc.), and file manifest (a list of files associated to a specific title). Depending on the type of content, this process includes receiving inputs from various parts of the platform. The rules creation process 212 includes creating individual rules to determine ownership, file location, characteristics, properties, naming conventions, and other operational data that govern content for any given source, based on the acquisition process. Then, based on the rule definition, the content is queued 213 for subsequent processing.

Validation 220:

The validation sub-system 220 of the ingestion system 120 includes three processes: check-in 221, properties 222, and automated quality assurance 223. The check-in process 221 checks file integrity and conformity to standards, for example PDF, ePUB2, ePUB3, XML, HTML, and other content formats. The properties process 222 associates content files that pass the check-in process 221 to a manifest that records changes applied to the content in subsequent processing of the content for publication by the platform. Content files that do not pass the check-in process 221 are flagged for further testing and validation. The further testing and validation may be performed, for example, by an automated quality assurance process 223. The automated quality assurance process 223 can support a large amount of content processed within the ingestion system 120.

Normalization 230:

The normalization sub-system 230 of the ingestion system 120 includes three processes: identification 231, manual quality assurance 232, and archiving 233. The identification process 231 assigns a unique identifier to each processed content file that identifies the content within the platform. The manifest for each content file is updated to include basic properties such as file name, size, source, type, time, and other ingestion specific processed data. In the manual quality assurance process 232, files that were flagged by the automated quality assurance process 223 of the validation sub-system 220 may be further inspected by a team of quality assurance engineers. Files that cannot be repaired are returned to their owner for correction. In the archiving process 233 of the normalization subsystem 230, files that are successfully processed and identified are stored in a database for access by the publishing system 130.

Publishing System

Figure 3:
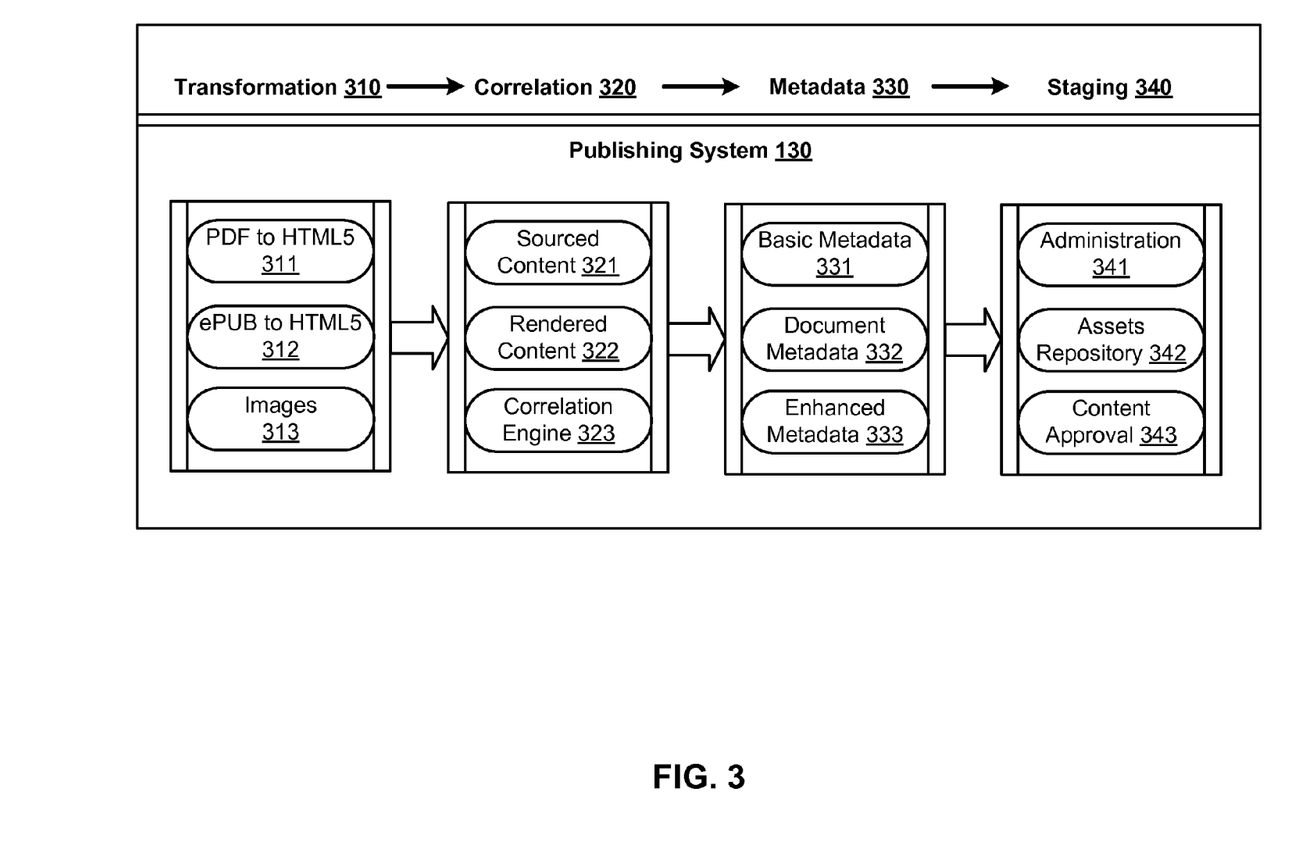
FIG. 3 illustrates a block diagram of a publishing system, in accordance with an embodiment of the invention.

FIG. 3 illustrates a block diagram of a publishing system 130, in accordance with an embodiment of the invention. The publishing system 130 is a sub-system of the management function block 102 of the platform illustrated in FIG. 1. The publishing system 130 transforms ingested printed and other documents into, for example, an HTML5 web format (or other markup language with suitable characteristics) with enhanced metadata, which is well-suited to distribution across a wide variety of consumer electronic devices connected to the platform via a network. It is noted that although embodiments of the invention are described herein with reference to HTML5, other markup languages with suitable characteristics may also be used in place of HTML5. The transformed content preserves the original page structure of the printed document, including the pagination of the original printed document, the number of columns and arrangement of paragraphs, the placement and appearance of graphics, titles and captions, and the fonts used, which are collectively referred to as preserving "page fidelity" of the printed document. Page fidelity is preserved by the publishing system 130, regardless of the original format of the source content provided by the content provider, and regardless of the complexity of the layout of the original document. The publishing system 130 includes four primary sub-systems: transformation 310, correlation 320, metadata 330, and staging 340.

Transformation 310:

The transformation sub-system 310 of the publishing system 130 includes three processes: PDF to HTML5 311, ePUB to HTML5 312, and images 313. In the PDF to HTML5 process 311, normalized PDF files are converted into sets of HTML5 web pages. This process keeps the page structure of the original file so that page fidelity is maintained even after the transformation to HTML5 is completed. In the ePUB to HTML5 process 312, similarly to PDF files, normalized ePUB files are converted into sets of HTML5 pages. This approach removes the need to download ePUB files along with a specific ePUB reader application to end-user devices. Thus, all published content is transformed into a set of secured downloadable individual HTML5 pages regardless of the original source content format. In the images process 313, all image content is transformed into bit maps. These bit maps can be exact copy images of the original source content before the transformation process is applied.

Correlation 320:

The correlation sub-system 320 of the publishing system 130 includes three processes: sourced content 321, rendered content 322, and correlation engine 323. During the HTML5 transformation, the page fidelity quality of the original document can be compromised by special characters, unusually complex layout and target Web Browser HTML conformity issues. To identify these potential differences, the correlation sub-system 320 compares the rendered HTML5 pages to the original source pages, and establishes a correlation factor between these files. The sourced content process 321 analyzes the original sourced content. Similarly, the rendered content process 322 analyzes the HTML5 rendered content. The correlation engine process 323 establishes a correlation factor between the sourced content and the rendered content that is indicative of the page fidelity quality. The correlation engine process 323 may use multiple different analysis techniques for comparing the sourced content and the rendered content, and the selection of a particular technique for a page may depend on the complexity of the page. For a simple page of only text, a simple text recognition algorithm may be used. For a complex document including various graphics, a mathematical process of analysis and comparison similar to a video face recognition algorithm that has been applied to complex document layout recognition can be used. In one embodiment, the correlation engine process 323 is configured to automatically analyze and compare large volumes of rendered HTML5 content across a matrix of targeted web browsers, such as Internet Explorer, Safari, Firefox, Opera, and other browser implementations, without manual intervention. For example, a typical book of several hundred pages, once converted into a single set of HTML5 pages, is tested against a matrix of selected web browsers for page fidelity accuracy. This involves potentially thousands of HTML5 pages that an automated system needs to analyze and flag for potential page fidelity problems. If the correlation factor does not at least meet a minimum threshold established for page fidelity quality, the page is flagged.

Metadata 330:

The metadata sub-system 330 of the publishing system 130 includes three processes: basic metadata 331, document metadata 332, and enhanced metadata 333. These metadata processes together form the basis for services that augment the user experience.

In the basic metadata process 331, a set of basic metadata is associated to every file added to the platform. Content sources in PDF and ePUB formats may be identified by their unique ISBN number. Once validated, ISBN numbers are matched against metadata sources such as the "ONIX for Books" international standard that describes a comprehensive list of data elements and components. Typically, basic metadata represents a small subset of the ONIX standard, including author, title, publisher name, release date, short description, cover page, and other book specific data that are selected by the service provider amount a pre-determined set of available data. As not all content can be associated with an existing ISBN number, for example user-generated content or unpublished academic content, the basic metadata process 331 also automatically extracts metadata by the analysis of file properties and content indexing for key word detection.

The document metadata process 332 creates and extracts metadata by deconstructing documents into basic elements of information. A partial list of document specific metadata includes, for example, sizes of images, types of images (such as graphs, tables, and pictures), locations, captions, number and size of columns, paragraphs, type of layout, embedded references, partial and full content indexing, border size, blank pages, and many others. Collectively, these document specific metadata are referred to herein as "document structure metadata." Document structure metadata identifies the location and composition of elements of information that make up a printed document. For example, the document structure metadata can identify the part of the document, such as title, subtitle, chapter, caption, image, sample questions, and the like, as well as where it is located within the printed document page.

The document metadata process 332 extracts metadata by deconstructing documents into basic elements of information by following a collection of rules to identify the parts of the document. For example, a page may be analyzed to determine the location of every character, blank space, and image on the page. The fonts of the characters are also analyzed to group characters into regions having the same font. To determine whether a region corresponds to a heading, subheading, body text, caption, or other identifiable part of the page, the relative size of the font, the position of the region relative to other known regions or objects, and the presence/absence of numbers that appear in a table of contents or index, may be considered. In one implementation, a series of rules are applied to categorize a region. For example, a region that has a larger font, has relatively few words, and spans more than one column is a heading. A region that is adjacent to an image and has relatively few words, is a caption. Reference to an index and/or table of contents of the document may also be helpful in classifying regions, as they may list the page numbers on which sections, images, etc., appear.

In one embodiment, by extracting document structure metadata during ingestion and storing it in connection with the ingested document, the platform has knowledge about the document that may be applied to delivering a richer reading experience to an end user. For example, if it is known that a particular segment of text is a caption for a picture on page of document, the picture and caption can be replaced or alternately shown with a multimedia element, for example a slide show with appropriate captions, a video clip with a related caption, or the like. As another example, if it is known that a section of a chapter of a text book contains review questions, the section can be replaced with an interactive quiz covering related content. As still other examples, substitutions or additions to other parts of a document may include merchandising offers, links to related content, or feedback mechanisms to teachers and/or authors. A process for identifying related content is described in greater detail with reference to FIG. 7.

In one embodiment, the document metadata process 332 identifies visual object elements by extracting metadata and deconstructing a document. Visual object elements may include, for example, images, graphs, tables, videos, formulas, special characters and other illustrations. In one embodiment, the document metadata process 332 also identifies captions or other reference text associated with each visual object element, such that each image may be displayed to the user with an associated caption. The document metadata process 332 also identifies text that supports or explains each visual object element from the remainder of the document. Thus, if a user requests text to better understand a displayed visual object element, the text may be provided to the user to support and explain the visual object element.

In one embodiment, the metadata process 333 generates a semantic understanding of the content in a document. For example, the metadata process 333 may rely on the outcome of the metadata process and document metadata process to identify concepts, subjects or ideas explained or referenced by the published text and visual object elements. For example, if an image and accompanying text is about a lion in a reserve, the metadata process 333 identifies wildlife habitat reserve as a concept explained by the image and the text. The metadata process 333 may then identify content related to the concept, subject or idea, for example from external sources, to further illustrate and explain the concept. In the example above, the metadata process 333 may identify other videos of wildlife habitats or recent news stories about wildlife habitats. Additional sources of related content may include, but are not limited to, news stories, blog posts, author notes, textbook revisions or updates, publisher provided addendums, webpage, video databases and image databases. As such, the metadata process 333 identifies content related to the visual object elements identified by the document metadata process 332.

Figure 8:
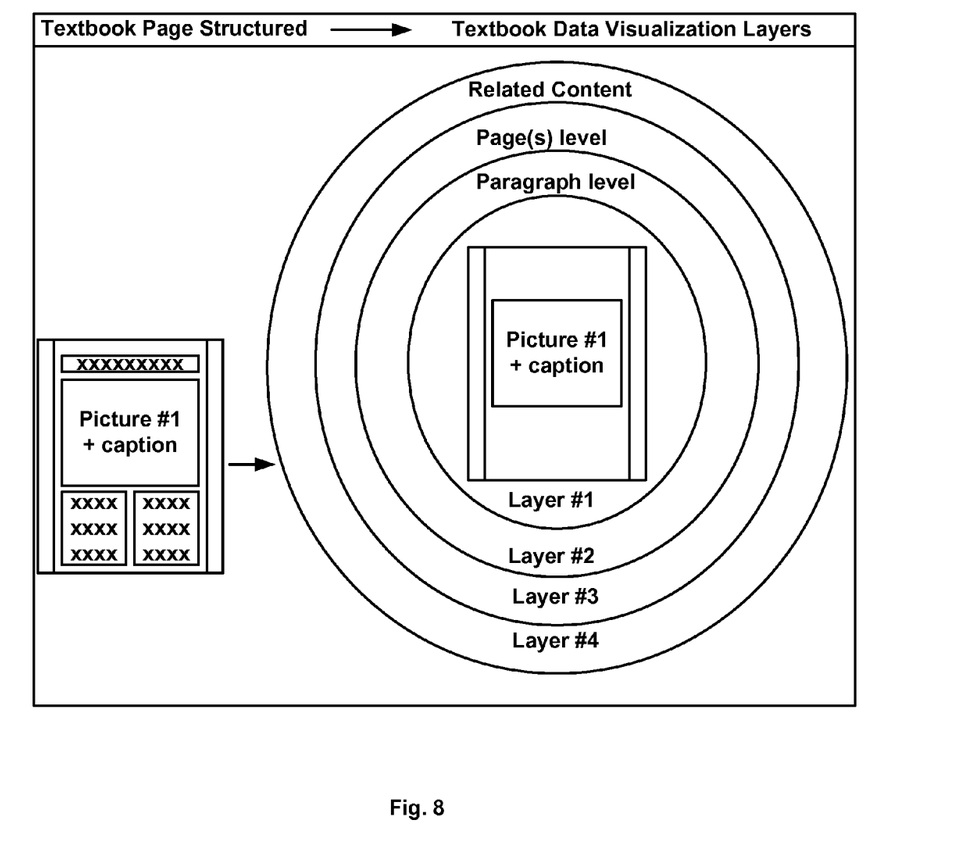
FIG. 8 illustrates layers of data available in a visualization interface, in accordance with an embodiment.

In addition, the enhanced metadata process 333 relies on the outcome of both the basic metadata process 331 and the document metadata process 332 to create an additional layer of metadata based on the combination of semantic analysis and business intelligence, in one implementation. From the fully indexed content, a semantic analyzer identifies key concepts, words and expressions that are necessary to support enhanced search features from within specific content as well as across one or more categories of content. From business intelligence, additional metadata such as content ratings, awards, bundles, discount prices, free chapters and reviews are among various other elements of information that may be included as enhanced metadata. As described above, the enhanced metadata sub-system 330 generates additional layers of information associated with a document. The layers of information associated with a picture are illustrated in FIG. 8. For example, the document metadata process 332 identifies a visual object element such as picture. A picture and its associated caption are identified as Layer 1 in FIG. 8. In addition, the document metadata process 332 identifies paragraphs and pages supporting or explaining the identified picture; the identified paragraphs and pages are illustrated as Layer 2 and Layer 3 respectively in FIG. 8. Based on the above identification by the document metadata process 332, the enhanced metadata process 333 identifies content associated with each visual object element and its supporting paragraphs and pages to identify content associated with the visual object element. In addition, the enhanced metadata process 333 identifies related content further explaining or updating the visual object element, the related content is illustrated as Layer 4 in FIG. 8. In one embodiment, a visual object element may be provided to the user and the additional layers of content illustrated in FIG. 8 may be provided to user to further elucidate and support a user's understanding of the concept described in the visual object element.

Staging 340:

The content staging sub-system 340 of the publishing system 130 includes three processes: administration 341, assets repository 342, and content approval 343. In the administration process 341, the content workflow is monitored, for example, by monitoring the recorded changes to the content in the file manifest to enable the identification and correction of any remaining quality issues, such as pages that have been flagged by previous processes for quality concerns. The assets repository process 342 stores the processed content, metadata, and other assets in preparation for final approval prior to delivery. The content approval process 343 validates content that meets the quality requirements and marks the content as approved for distribution. At this point, the content is prepared for final delivery to end-users.

Distribution System

Figure 4:
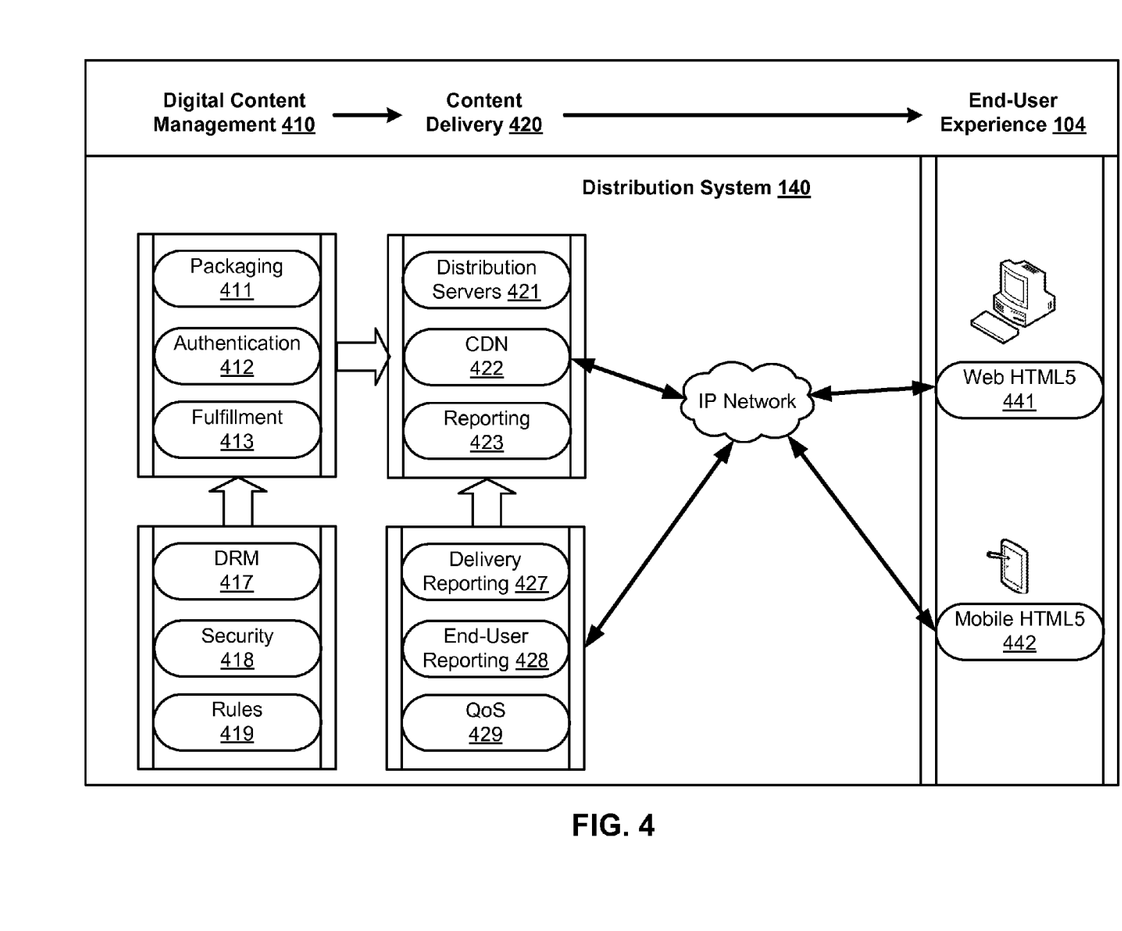
FIG. 4 illustrates a block diagram of a distribution system, in accordance with an embodiment.

FIG. 4 illustrates a block diagram of a distribution system 140, in accordance with an embodiment. The distribution system 140 is a sub-system of the management function block 102 of the platform illustrated in FIG. 1. The distribution system 140 packages the content for delivery, uploads the content to content distribution networks, and makes the content available to end-users based on the content's digital rights management policies. Functionally, the distribution system 140 includes two primary sub-systems: digital content management 410 and content delivery 420.

Digital content management 410:

The digital content management sub-system 410 includes three processes: packaging 411, authentication 412, and fulfillment 413.

The packaging process 411 packages together all files associated with a particular portion of a content file, referred to as an "asset," before the asset is distributed. Specifically, content and metadata files include, for example, pictures of different resolution, character fonts, thumbnails, and a bookmarked table of contents, that are combined together into a data package that represents the asset.

The authentication process 412 prepares the content for distribution according to content protection mechanisms that may vary according to service offerings, may vary according to publishers, and/or even may vary according to individual assets. The authentication process 412 receives input from DRM module 417, security module 418, and rules module 419. The DRM module 417 encrypts content into a DRM layer, typically using Advanced Encryption Standard (AES) Kerberos 128, which protects the content from being easily copied by end-users once it is partially downloaded to their client device. The security module 418 protects content by additional security layers defined at the service level, in one embodiment. These additional security layers are typically the result of complex eCommerce business rules that specify how content needs to be protected. The rules module 419 defines the business rules governing content protection that are specific to content owners, may be specific to the particular service being deployed and/or the specific asset. The level of content protection can be adjusted based on the content that is being distributed across particular services. As an example, a publisher or a service provider may want to limit the number of pages that can be printed by the end-user. As another example, a chapter of a book may be available for free. As another example, content may be bundled into time-based promotional offers.

The fulfillment process 413 tracks the status of an order once a purchase order is received by the management function block 102 of the platform. The content associated with the order is identified, associated to the account that created the order, and marked for distribution. The fulfillment process 413 reports the status of the order to the eCommerce system 160 of the management function block 102. As an example, a typical order is processed through a number of logical steps, including order configuration, order booking, acknowledgement/confirmation, invoicing/billing, order changes, order processing, delivery, settlement, and returns/refunds.

Content delivery 420:

The content delivery sub-system 420 handles the delivery of content to end-users. The content delivery sub-system 420 includes three processes: distribution servers 421, content distribution networks 422, and reporting 423.

The distribution servers process 421 centralizes the content available for distribution before uploading it to the content distribution networks (CDN), based on the outcome of the digital content management sub-system 410. User-generated content created by end-user web applications is also uploaded by the distribution servers process 421 so that it can be stored, synchronized and redistributed to the CDN network for later consumption.

The content distribution networks process 422 uploads content to the CDN origin server. Once the content is uploaded to the CND origin server, the content is pushed automatically to CDN edge servers geographically distributed around the country where each page and elements of a document are referenced with its own short time-based URL shared with an end-user web application. Hence, the content is effectively protected from unauthorized distribution. In one implementation, third-party CDN server infrastructure, such as Akamai for example, is used to host the content closer to end-users, facilitating scalability and performance requirements of the server infrastructure while improving user experience access time to the content.

The reporting process 423 receives input from a delivery reporting module 427, an end-user reporting module 428, and a quality of service module 429 in order to report on issues that may affect the user's experience or digital right management. The delivery reporting module 427 reports content that is recorded as delivered to the end-user web application so that content delivery issues can be monitored across the CDN and distribution servers. As examples, incorrect URLs or obsolete time sensitive URLs need to be identified and renewed based on the digital content management sub-system 410. The end-user reporting module 428 receives reports from the end-user web application that monitors reading activities and aggregates these into a report on a frequent periodic basis. Examples of activities tracked include the number of printed document pages and volume of copy/paste activities, as defined by business rules specified by individual publishers or platform-wide business rules. The quality of service module 429 aggregates data reported by web applications and their users to identify service level issues that are possibly affecting the overall quality of the user experience. Examples of quality of service issues include incorrectly formatted content, CDN latencies or content synchronization issues.

Back-Office System

Figure 5:
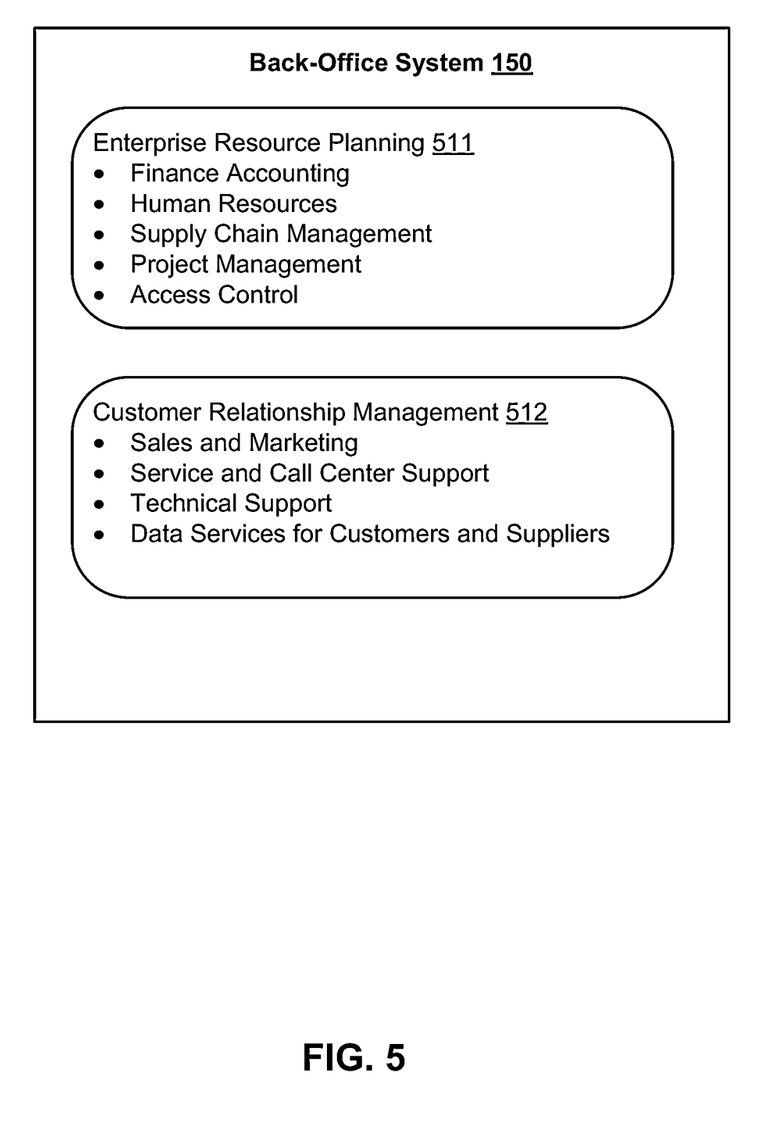
FIG. 5 illustrates a block diagram of a back-office system, in accordance with an embodiment.

FIG. 5 illustrates a block diagram of a back-office system 150, in accordance with an embodiment. The back-office system 150 is a sub-system of the management function block 102 of the platform illustrated in FIG. 1. The back-office system 150 integrates the processes dedicated to running the business, identified as enterprise resource planning 511 and the processes dealing with the customers for the business, globally identified as customer relationship management 512.

Within enterprise resource planning 511, the back-office system 150 performs finance accounting tasks such as maintaining the general ledger, tracking payables and receivables, managing the cash and fixed assets, and budgeting. The back-office system 150 also handles human resource tasks such as payroll, training, benefits, recruiting, and diversity management, as well as handling supply chain management, including inventory, order entry, purchasing, claim processing, and commissions. The back-office system 150 may also be used for project management, including costing, billing, time and expense calculations, performance units, and activity management. Lastly, the enterprise resource planning 511 of the back-office system 150 may also be used to control access and manage user privileges for internal and external processes.

Within customer relationship management 512, the back-office system 150 manages the interactions with the customers, clients, and sales prospects by synchronizing business specific processes, including sales and marketing, customer service and call center support, technical support, and data services for customers and suppliers.

eCommerce System

Figure 6:
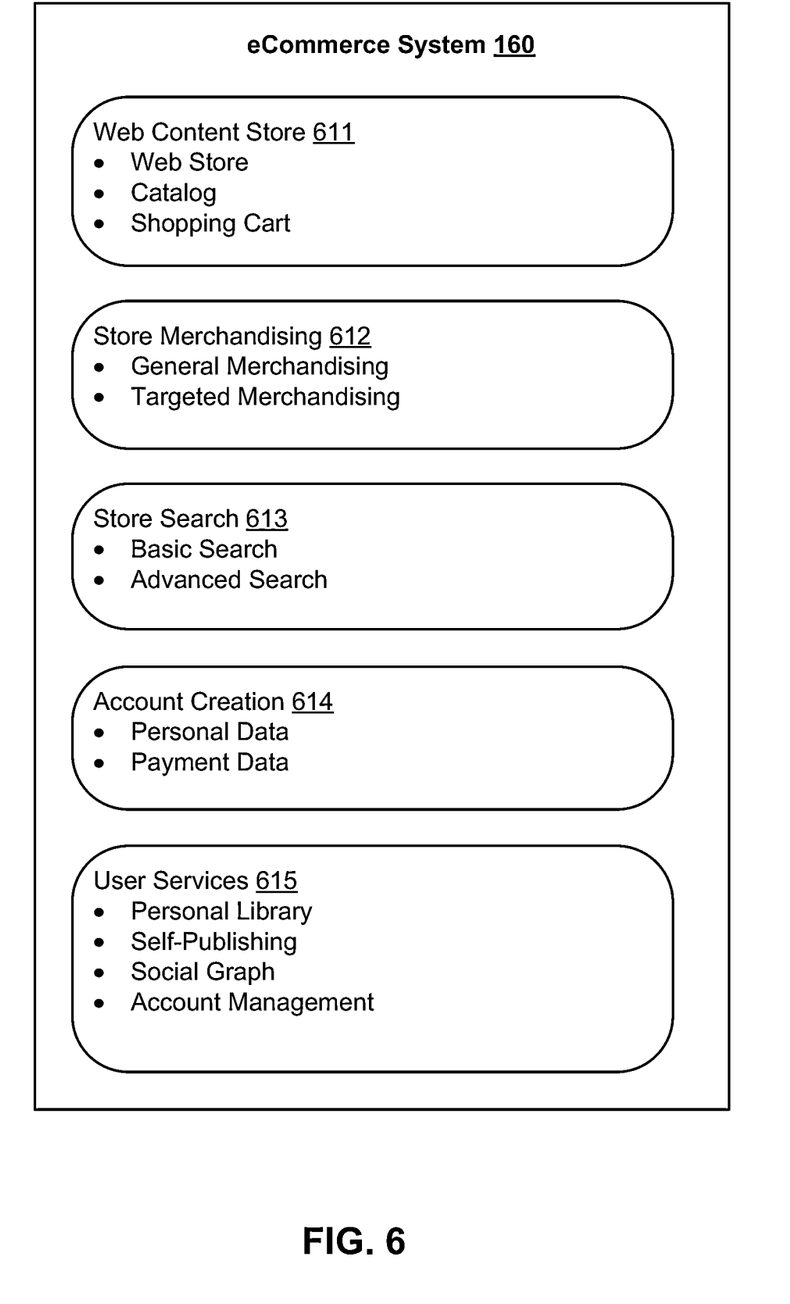
FIG. 6 illustrates a block diagram of an eCommerce system, in accordance with an embodiment.

FIG. 6 illustrates a block diagram of an eCommerce system 160, in accordance with an embodiment. The eCommerce system 160 is a sub-system of the management function block 102 of the platform illustrated in FIG. 1. The eCommerce system 160 manages the online processes of marketing, selling, servicing and receiving payment for digital products and services. As such, the eCommerce system 160 is closely interfaced to the publishing system 130 and distribution system 140, as well as to the back-office system 150. The eCommerce system 160 components include the web content store 611, store merchandising 612, store search 613, account creation 614, and user services 615.

The web content store component 611 presents to customers all available content and services. The web store is accessed by connecting to an on-line website that defines how content is being offered to customers. For example, a digital education store includes a large library of textbooks, academic content, and other tradebooks, such as Biology, Economics, and Philosophy, for example, as well as various education and social specific services that are offered to students, teachers, and other users. The web content store 611 also includes at least one product content catalog that assembles content available from the web store. Catalogs may be organized around content categories, topics, or types, and may include metadata such as pricing, professional reviews, awards, descriptions, user reviews and thumbnails, for example. The web content store 611 also includes a shopping cart. The shopping cart is a software component that allows web content store customers to accumulate a list of items for purchase. Upon checkout, the shopping cart software typically calculates a total for the order, including taxes, as applicable.

The store merchandizing component 612 comprises general merchandizing and targeted merchandising. General merchandising includes promoting specific products from the content catalog and offering them for sale at the web content store 611. This is a sales driven activity that is usually accomplished via a combination of analytics, product placement, price offerings, promotion and other business intelligence services. Targeted merchandising includes presenting specific products and services that are tailored to the end-user or group of end-users based on their respective profiles, analytics and/or reported activities.

The store search component 613 includes in one implementation a basic search and an advanced search. The basic search comprises searching through the available store content. Typical searches include document titles, topics, categories, authors, publishers and other available catalog metadata. The advanced search comprises searching for key words or specific expressions within the available content store. In this advanced search mode, the user provides the search engine with a phrase which defines a semantic concept for which the user is trying to gather information. The results of the search typically locate a number of documents that together aggregate the information desired to be gathered.

The account creation component 614 creates and registers a secure account for a user, so that the user is able to purchase content and services from the web content store 611. The account creation component 614 stores personal account data, such as name, address, email, phone number, login and password information. In addition to personal data, end users may also enter their payment information such as credit card number, PayPal or bank account details in order to be able to purchase content and services from the web content store 611. Payment data is then linked to the shopping cart for processing purchases as they occur.

The user services component 615 manages a number of customer-based services that are available as part of the web content store 611 offerings. For example, a digital education platform may include a number of services such as personal library, self-publishing, a user's social graph, and account management, among others.

The personal library is the aggregation of content and services purchased and created over time by an individual end user. In a digital education platform, it would typically include all textbooks and tradebooks purchased by a student, as well as all the student's user-generated content such as notes, highlights, and other comments.

Self-publishing is a service offered to end users interested in publishing their own content. In a digital education platform, a student or teacher may have content that they would want to share with their peers. For example, a student may have developed a course outline or other study materials to share with other students, and a teacher may have lecture materials or practice exams to share with other teachers or students. As such, the self-publishing service would ingest that content into the platform and add it to the content catalog, or a subset of it, as identified by the end user rights and privacy settings.

In one embodiment, the social graph is a system to determine, display, and act upon the relationships among all users of the online education platform, including students, teachers, and authors. For example, the social graph of a student is the collective connections between the student and the student's teachers, classes, classmates, etc. The social graph of a teacher is the collective connections between the teacher and the teacher's students, classes, colleagues, etc. The social graph of an author is the collective connections between the teachers that use the author's book, the students reading the author's book, etc. Collectively, these links and connections define how specific content and services can be tailored and proposed to specific end users.

Account management includes user-specific services that are dedicated to the setting, management, and monitoring of a particular account, including privacy, personal data, transaction listings, banking information and social graph information among other aspects.

Visual Object Elements

Figure 7:
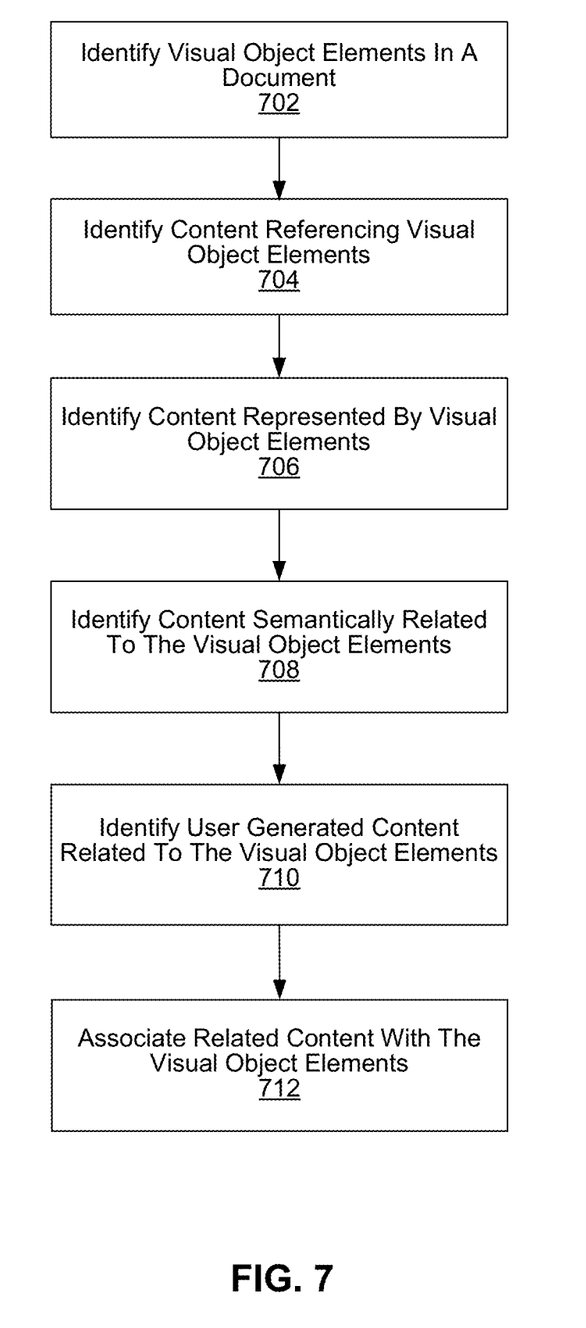
FIG. 7 illustrates a process for providing a visualization interface, in accordance with an embodiment.

FIG. 7 illustrates a process for providing an interface displaying visual object element, in accordance with an embodiment. In one embodiment, the process deconstructs a document by identifying 702 visual object elements within the document. Visual object elements may be any visual element on a page, including but not limited to, images, graphs, tables, videos and other illustrations. In one embodiment, the visual object elements may be identified based on their size, shape, color or position within a page. In addition, the process identifies captions or other reference numbers associated with each visual object element.

In one embodiment, the process identifies 704 content referencing the visual object element. For example, the process may identify 704 paragraphs or pages that describe or explain a visual object element. In one implementation, such content may be identified if it includes the caption or reference number within its text.

In one embodiment, the process identifies 706 the subject or an idea represented by a visual object element and its accompanying paragraphs or pages. The process may use an image recognition algorithm or a text parser to identify the concepts conveyed by the visual object element and its accompanying text. In one embodiment, the process relies heavily on a caption associated with the visual object element to identify the subject or concept associated with the identified visual object element.

In one embodiment, the process identifies related content 708 that is semantically related to a subject or an idea represented by the visual object element. The process may identify 708 the related content by performing a keyword search, wherein the keywords are the concepts or ideas represented by a visual object element. In addition, the process may perform an image search, wherein the visual object element represents an image and the search results may include additional images that are visually or conceptually similar to the visual object element. The process may find the related content from databases, including, but not limited to, textbooks, textbook addendums, author notes, webpage, blog posts, etc.

In one embodiment, the process identifies 710 user generated content that is related to the visual object element or its accompanying text. User generated content may include, for example, notes, highlights, copy/paste operations, etc., and are provided on the published content on a web application executing on a client device. In one embodiment, the process identifies 710 user generated content that is conceptually related to the concept or ideas represented by the visual object element. In other embodiments, the process identifies 710 user generated content that is generated on a same page that displays the visual object element or on a page that describes the visual object element.

In one embodiment, the process associates 712 the identified related content and the identified user generated content such that the related content may be displayed to a user in relation to a visual object element. The association between the related content and the visual object element may be stored on a computing device associated with the education digital reading platform. In one embodiment, the association is provided to the interface sub-system 165 such that the related content is sent to the user within a visualization interface.

Referring now to FIG. 1, the interface engine 165 may receive an association between visual object elements and related content and user generated related content. In one embodiment, the interface engine 165 generates interface object elements that permits a user to navigate within a document based by moving from one visual object element to another. Additionally, the interface engine 165 generates a link that allows the user to view the related content and related user generated content associated with each visual object element. In one embodiment, the interface engine 165 sends the interface elements to a web application executing on a client device via a network.

Figure 9:
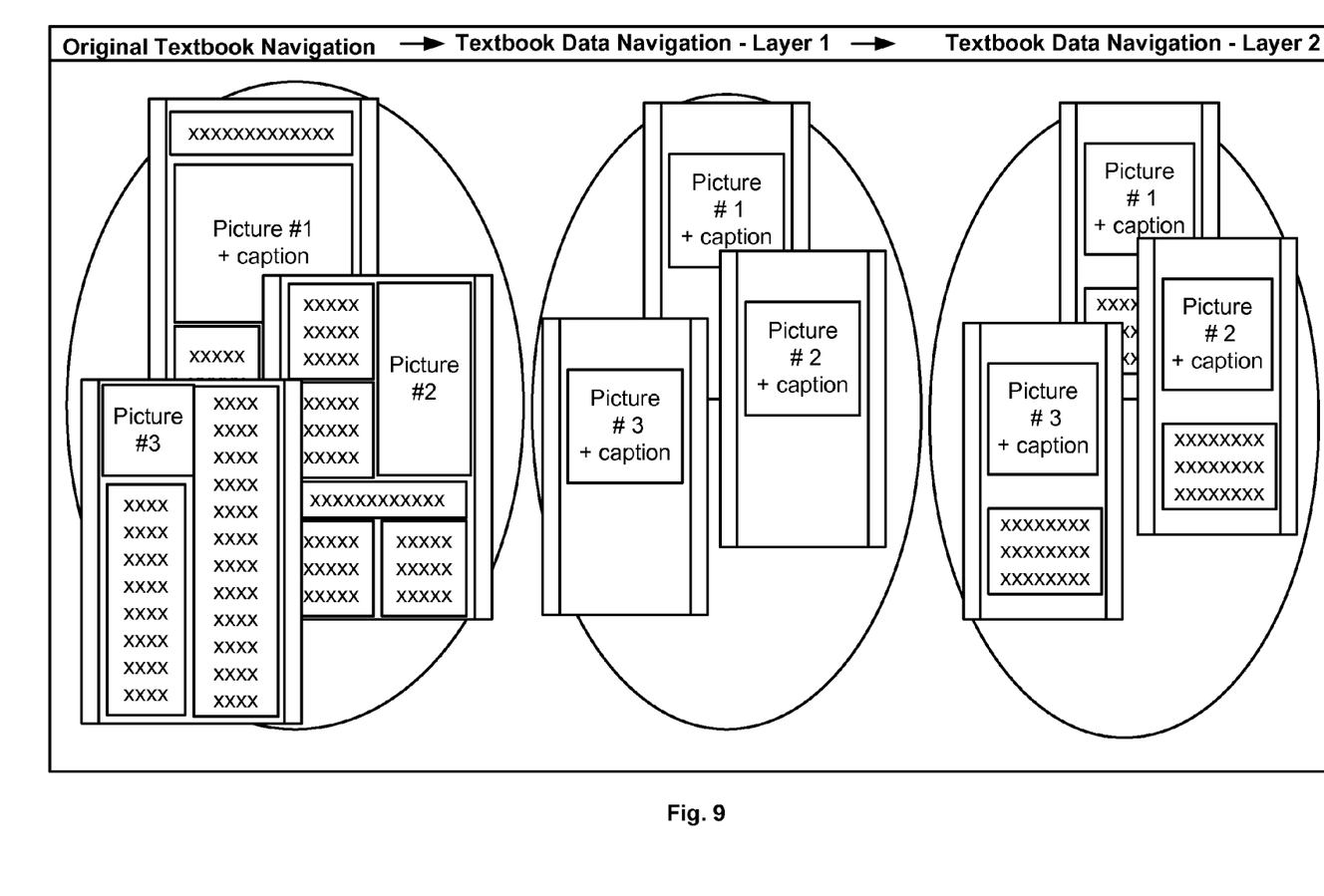
FIG. 9 illustrates user interfaces displaying traditional and visualization interfaces, in accordance with an embodiment.

FIG. 9 illustrates a visualization interface in accordance with an embodiment. The original document navigation includes titles, text and images. The images and text may be arranged as desired by a publisher, however, the images are generally provided as a way to illustrate the text. Document Data Navigation—Layer 1 displays the visual object elements of a text book page with an associated caption. If the user requests additional information, additional layers of content may be provided to the user. Document Data Navigation—Layer 2 represents the additional content to support the visual object element of a page. As described above with reference to FIG. 8, the additional content layers may include paragraphs and pages referencing the visual object element or related content and user generated related content. In such an interface, a user is enabled to navigate a document using visual object elements. Such an interface permits a user to absorb a large amount of data quickly and reliably by viewing visual object elements of a document. Additionally, by offering an alternative view of the content, the visualizations interface may enhance a user's engagement with and understanding of the content.

Additional Configuration Considerations

The present invention has been described in particular detail with respect to several possible embodiments. Those of skill in the art will appreciate that the invention may be practiced in other embodiments. The particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer and run by a computer processor. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

In addition, the present invention is not limited to any particular programming language. It is appreciated that a variety of programming languages may be used to implement the teachings of the present invention as described herein, and any references to specific languages, such as HTML5, are provided for enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A method for navigating an educational electronic document by visual object elements, the method comprising:
    identifying a plurality of visual object elements within the educational electronic document by deconstructing the document, wherein deconstructing the document comprises determining a structure of the educational electronic document specifying a page of the educational electronic document associated with each visual object element;
    sending a first page of the educational electronic document for display to a user by an eReading browser application, the first page having a visual object element and one or more textual regions;
    responsive to a first user input received at the eReading browser application, sending for presentation to the user, a visualization interface displaying a first visual object element associated with the first page of the educational electronic document and not displaying the one or more textual regions of the first page, the visualization interface displayed by the eReading browser application; and
    responsive to a second user input received at the visualization interface, navigating to a second visual object element of the educational electronic document according to the determined structure of the document, the second visual object element associated with a second page having one or more textual regions, wherein navigating comprises:
        sending the second visual object element for display in the visualization interface and not displaying the one or more textual regions of the second page.

2. The method of claim 1, wherein a visual object element is identified by at least one of its size, shape, color and location within a document.

3. The method of claim 1, wherein visual object elements comprise at least one of an image, a video, a graph, a formula, a special character and a table.

4. The method of claim 1:
    wherein determining the structure of the educational electronic document comprises accessing a table of contents associated with the educational electronic document, the table of contents specifying an ordering of the visual object elements in the document; and
    wherein navigating according to the determined structure of the document comprises navigating to a next visual object element in the ordering specified by the table of contents.

5. The method of claim 1, wherein the educational electronic document is a textbook.

6. The method of claim 1, wherein each visual object element is associated with a caption describing the visual object element, the method further comprising:
    identifying content of the educational electronic document respectively related to each of the plurality of visual object elements, the related content semantically related to a corresponding visual object element or the caption describing the visual object element; and
    responsive to receiving a third user input, sending the related content for display in the visualization interface.

7. The method of claim 6, further comprising:
    identifying at least one concept represented by the visual object element; and
    identifying the content related to a corresponding visual object element based on the identified concept.

8. The method of claim 6, wherein identifying the related content comprises searching for the related content in a textbook addendum.

9. The method of claim 6, wherein the content of the educational electronic document related to each visual object element is a paragraph of the document.

10. The method of claim 6, wherein the content of the educational electronic document related to each visual object element is a page of the document.

11. The method of claim 6, wherein the visualization interface is configured to display the content related to the first visual object element adjacent to the first visual object element.

12. A non-transitory computer-readable storage medium storing executable computer program instructions for navigating an educational electronic document by visual object elements, the computer program instructions comprising instructions for:
    identifying a plurality of visual object elements within the educational electronic document by deconstructing the document, wherein deconstructing the document comprises determining a structure of the educational electronic document specifying a page of the educational electronic document associated with each visual object element;
    sending a first page of the educational electronic document for display to a user by an eReading browser application, the first page having a visual object element and one or more textual regions;
    responsive to a first user input received at the eReading browser application, sending for presentation to the user, a visualization interface displaying a first visual object element associated with the first page of the educational electronic document and not displaying the one or more textual regions of the first page, the visualization interface displayed by the eReading browser application; and responsive to a second user input received at the visualization interface, navigating to a second visual object element of the educational electronic document according to the determined structure of the document, the second visual object element associated with a second page having one or more textual regions, wherein navigating comprises:
sending the second visual object element for display in the visualization interface and not displaying the one or more textual regions of the second page.

13. The non-transitory computer-readable medium of claim 12, wherein a visual object element is identified by at least one of its size, shape, color and location within a document.

14. The non-transitory computer-readable medium of claim 12, wherein visual object elements comprise at least one of an image, a video, a graph, a formula, a special character and a table.

15. The non-transitory computer-readable medium of claim 12:
wherein determining the structure of the educational electronic document comprises accessing a table of contents associated with the educational electronic document, the table of contents specifying an ordering of the visual object elements in the document; and
wherein navigating according to the determined structure of the document comprises navigating to a next visual object element in the ordering specified by the table of contents.

16. The non-transitory computer-readable medium of claim 12, wherein the educational electronic document is a textbook.

17. The non-transitory computer readable medium of claim 12, wherein each visual object element is associated with a caption describing the visual object element, further comprising instructions for:
identifying content of the educational electronic document respectively related to each of the plurality of visual object elements, the related content semantically related to a corresponding visual object element or the caption describing the visual object element; and
responsive to receiving a third user input, sending the related content for display in the visualization interface.

18. The non-transitory computer-readable medium of claim 17, further comprising instructions for:
identifying at least one concept represented by the visual object element; and
identifying the content related to a corresponding visual object element based on the identified concept.

19. The non-transitory computer-readable medium of claim 17, wherein identifying the related content comprises searching for the related content in a textbook addendum.

20. The non-transitory computer-readable medium of claim 17, wherein the content of the educational electronic document related to each visual object element is a paragraph of the document.

21. The non-transitory computer-readable medium of claim 17, wherein the content of the educational electronic document related to each visual object element is a page of the document.

22. The non-transitory computer-readable medium of claim 17, wherein the visualization interface is configured to display the content related to the first visual object element adjacent to the first visual object element.

* * * * *